(12) United States Patent  
Anderson et al.

(10) Patent No.: US 9,095,145 B2
(45) Date of Patent: Aug. 4, 2015

(54) METHOD AND SYSTEM FOR THE DIRECT INJECTION OF ASPARAGINASE INTO A FOOD PROCESS

(75) Inventors: Keith Steve Anderson, Lewisville, TX (US); Eric Richard Boudreaux, Dallas, TX (US); David Brian Emerson, Coppell, TX (US); Phillip Stuart Frazier, Frisco, TX (US); Glenn Sims Pratt, Frisco, TX (US)

(73) Assignee: Frito-Lay North America, Inc., Plano, TX (US)

( * ) Notice: Subject to any disclaimer, the term of this patent is extended or adjusted under 35 U.S.C. 154(b) by 955 days.

(21) Appl. No.: 12/205,330

(22) Filed: Sep. 5, 2008

(65) Prior Publication Data

US 2010/0062123 A1    Mar. 11, 2010

(51) Int. Cl.
  A21D 6/00   (2006.01)
  A21D 2/00   (2006.01)
  A21D 8/02   (2006.01)
  A21D 8/04   (2006.01)

(52) U.S. Cl.
  CPC ..................................... *A21D 8/042* (2013.01)

(58) Field of Classification Search
  CPC ..................................................... A61D 8/042
  USPC ........................ 426/250, 519, 549, 534, 496
  See application file for complete search history.

(56) References Cited

U.S. PATENT DOCUMENTS

| | | | |
|---|---|---|---|
| 1,053 A | 12/1838 | Hatfield | |
| 1,782,960 A | 11/1930 | Erysin | |
| 2,448,152 A | 8/1948 | Patton | |
| 2,490,431 A | 12/1949 | Greene | |
| 2,498,024 A | 2/1950 | Baxter | |
| 2,584,893 A | 2/1952 | Lloyd | |
| 2,589,591 A | 3/1952 | Xander | |
| 2,611,705 A | 9/1952 | Hendel | |
| 2,704,257 A | 3/1955 | deSellano | |
| 2,723,202 A | 11/1955 | Rivoche | |
| 2,744,017 A | 5/1956 | Baldwin | |
| 2,759,832 A | 8/1956 | Cording, Jr. | |
| 2,762,709 A | 9/1956 | Janis | |

(Continued)

FOREIGN PATENT DOCUMENTS

| CL | 4032002 | 6/2003 |
|---|---|---|
| DE | 2743230 A1 | 4/1979 |

(Continued)

OTHER PUBLICATIONS

Ciesarova et al., "Impact of L-asparaginase on Acrylamide Content in Potato Products," 2006 (no month), Journal of Food and Nutrition Research, vol. 45, No. 4, pp. 141-146.*

(Continued)

*Primary Examiner* — Michele L. Jacobson
*Assistant Examiner* — Tynesha McClain-Coleman
(74) *Attorney, Agent, or Firm* — James R. Gourley; Colin P. Cahoon; Carstens & Cahoon, LLP (57) ABSTRACT

A method and system for the direct injection of a concentrated additive is disclosed. In one aspect, the concentrated additive comprises asparaginase. Because dilution of asparaginase in chlorinated drinking water can reduce the activity of the enzyme thereby making the enzyme less effective the direct injection of the enzyme into a dough can increase the acrylamide reduction in food products.

18 Claims, 2 Drawing Sheets

(56) References Cited

U.S. PATENT DOCUMENTS

| | | |
|---|---|---|
| 2,780,552 A | 2/1957 | Willard |
| 2,893,878 A | 7/1959 | Simon |
| 2,905,559 A | 9/1959 | Anderson |
| 2,910,367 A | 10/1959 | Melnick |
| 2,959,487 A | 11/1960 | Knotter et al. |
| 2,987,401 A | 6/1961 | Johnston |
| 3,026,885 A | 3/1962 | Eytinge |
| 3,027,258 A | 3/1962 | Markakis |
| 3,038,810 A | 6/1962 | Akerboom |
| 3,044,880 A | 7/1962 | Bogyo |
| 3,085,020 A | 4/1963 | Backinger |
| 3,219,458 A | 11/1965 | Higby |
| 3,278,311 A | 10/1966 | Brown |
| 3,305,366 A | 2/1967 | Sutton |
| 3,359,123 A | 12/1967 | Katucki |
| 3,365,301 A | 1/1968 | Lipoma |
| 3,369,908 A | 2/1968 | Gonzalez |
| 3,370,627 A | 2/1968 | Willard |
| 3,404,986 A | 10/1968 | Wimmer |
| 3,436,229 A | 4/1969 | Simpson |
| 3,460,162 A | 8/1969 | Sijbring |
| 3,493,400 A | 2/1970 | Truckenbrodt et al. |
| 3,545,979 A | 12/1970 | Ghafoori |
| 3,573,070 A | 3/1971 | Smith et al. |
| 3,578,463 A | 5/1971 | Smith |
| 3,608,728 A | 9/1971 | Trimble |
| 3,620,925 A | 11/1971 | Mochizuki |
| 3,627,535 A | 12/1971 | Davidson |
| 3,634,095 A | 1/1972 | Willard |
| 3,652,402 A | 3/1972 | Chibata |
| 3,687,679 A | 8/1972 | Sijbring |
| 3,690,895 A | 9/1972 | Amadon |
| 3,725,087 A | 4/1973 | Miller |
| 3,773,624 A | 11/1973 | Wagner |
| 3,782,973 A | 1/1974 | Pittet |
| 3,812,775 A | 5/1974 | Sijbring |
| 3,849,582 A | 11/1974 | Blagdon |
| 3,851,572 A | 12/1974 | Lazzarini |
| 3,870,809 A | 3/1975 | Green |
| 3,914,436 A | 10/1975 | Nakadai |
| 3,917,866 A | 11/1975 | Purves |
| 3,925,568 A | 12/1975 | Rao |
| 3,987,210 A | 10/1976 | Cremer |
| 3,997,684 A | 12/1976 | Willard |
| 3,998,975 A | 12/1976 | Liepa |
| 4,005,225 A | 1/1977 | Craig |
| 4,073,952 A | 2/1978 | Standing |
| 4,084,008 A | 4/1978 | Yueh |
| 4,111,714 A | 9/1978 | Hippchen et al. |
| 4,122,198 A | 10/1978 | Wisdom |
| 4,124,727 A | 11/1978 | Rockland |
| 4,136,208 A | 1/1979 | Light |
| 4,140,801 A | 2/1979 | Hilton |
| 4,167,137 A | 9/1979 | van Remmen |
| 4,192,773 A | 3/1980 | Yoshikawa |
| 4,199,612 A | 4/1980 | Fragas |
| 4,210,594 A | 7/1980 | Logan |
| 4,251,895 A | 2/1981 | Caridis |
| 4,272,554 A | 6/1981 | Schroeder |
| 4,277,510 A | 7/1981 | Wicklund |
| 4,293,582 A | 10/1981 | Hamann et al. |
| 4,312,892 A | 1/1982 | Rubio |
| 4,317,742 A | 3/1982 | Yamaji |
| 4,348,417 A | 9/1982 | Greup et al. |
| 4,366,749 A | 1/1983 | Caridis |
| 4,394,398 A | 7/1983 | Wilson |
| 4,418,088 A | 11/1983 | Cantenot |
| 4,461,832 A | 7/1984 | Tschang |
| 4,537,786 A | 8/1985 | Bernard |
| 4,555,409 A | 11/1985 | Hart |
| 4,582,927 A | 4/1986 | Fulcher |
| 4,594,260 A | 6/1986 | Vaquerio |
| 4,595,597 A | 6/1986 | Lenchin |
| 4,645,679 A | 2/1987 | Lee |
| 4,673,581 A | 6/1987 | Fulcher |
| 4,706,556 A | 11/1987 | Wallace |
| 4,721,625 A | 1/1988 | Lee |
| 4,749,579 A | 6/1988 | Haydock |
| 4,751,093 A | 6/1988 | Hong |
| 4,756,916 A | 7/1988 | Dreher |
| 4,806,377 A | 2/1989 | Ellis |
| 4,844,930 A | 7/1989 | Mottur |
| 4,844,931 A | 7/1989 | Webb |
| 4,863,750 A | 9/1989 | Pawlak |
| 4,884,780 A | 12/1989 | Ohashi |
| 4,889,733 A | 12/1989 | Willard |
| 4,900,576 A | 2/1990 | Bonnett |
| 4,917,909 A | 4/1990 | Prosise |
| 4,931,296 A | 6/1990 | Shanbhag |
| 4,933,199 A | 6/1990 | Neel |
| 4,937,085 A | 6/1990 | Cherry |
| 4,963,373 A | 10/1990 | Fan |
| 4,966,782 A | 10/1990 | Heidolph |
| 4,971,813 A | 11/1990 | Strobel |
| 4,978,684 A | 12/1990 | Cerami |
| 4,985,269 A | 1/1991 | Irvin |
| 5,002,784 A | 3/1991 | Pare |
| 5,009,903 A | 4/1991 | deFigueiredo |
| 5,035,904 A | 7/1991 | Huang |
| 5,045,335 A | 9/1991 | DeRooij |
| 5,071,661 A | 12/1991 | Stubbs |
| 5,087,467 A | 2/1992 | Schwank |
| 5,126,153 A | 6/1992 | Beck |
| 5,134,263 A | 7/1992 | Smith |
| 5,137,740 A | 8/1992 | Benson |
| 5,167,975 A | 12/1992 | Tsurumaki |
| 5,171,600 A | 12/1992 | Young |
| 5,176,933 A | 1/1993 | Fulcher |
| 5,196,225 A | 3/1993 | Lush |
| 5,232,721 A | 8/1993 | Polansky |
| 5,279,840 A | 1/1994 | Baisier |
| 5,292,542 A | 3/1994 | Beck |
| 5,298,274 A | 3/1994 | Khalsa |
| 5,356,646 A | 10/1994 | Simic-Glavaski |
| 5,362,511 A | 11/1994 | Villagran |
| 5,368,879 A | 11/1994 | White |
| 5,370,898 A | 12/1994 | Zussman |
| 5,389,389 A | 2/1995 | Beck |
| 5,391,384 A | 2/1995 | Mazza |
| 5,391,385 A | 2/1995 | Seybold |
| 5,393,543 A | 2/1995 | Laufer |
| 5,394,790 A | 3/1995 | Smith |
| 5,441,758 A | 8/1995 | Lewis |
| 5,447,742 A | 9/1995 | Malvido |
| 5,458,903 A | 10/1995 | Colson |
| 5,464,642 A | 11/1995 | Villagran |
| 5,464,643 A | 11/1995 | Lodge |
| 5,505,978 A | 4/1996 | Roy |
| 5,514,387 A | 5/1996 | Zimmerman |
| 5,534,280 A | 7/1996 | Welch |
| 5,554,405 A | 9/1996 | Fazzolare |
| 5,558,886 A | 9/1996 | Martinez-Bustos |
| 5,580,598 A | 12/1996 | Benson |
| 5,589,213 A | 12/1996 | Desai |
| 5,603,972 A | 2/1997 | McFarland |
| 5,603,973 A | 2/1997 | Benson |
| 5,620,727 A | 4/1997 | Gerrish |
| 5,676,042 A | 10/1997 | Sakuma |
| 5,690,982 A | 11/1997 | Fazzolare |
| 5,695,804 A | 12/1997 | Hnat |
| 5,707,671 A | 1/1998 | Beck |
| 5,747,084 A | 5/1998 | Cochran |
| 5,776,531 A | 7/1998 | Aasman |
| 5,792,499 A | 8/1998 | Atwell |
| 5,846,589 A | 12/1998 | Baker |
| 5,858,429 A | 1/1999 | Wallace |
| 5,858,431 A | 1/1999 | Wiedersatz |
| 5,887,073 A | 3/1999 | Fazzari |
| 5,919,691 A | 7/1999 | Schulein |
| 5,945,146 A | 8/1999 | Twinam |
| 5,947,010 A | 9/1999 | Barry |
| 5,972,367 A | 10/1999 | Inoue |
| 5,972,397 A | 10/1999 | Durance |
| 6,001,409 A | 12/1999 | Gimmler |

(56) References Cited

U.S. PATENT DOCUMENTS

| | | | |
|---|---|---|---|
| 6,016,096 A | 1/2000 | Barnes | |
| 6,025,011 A | 2/2000 | Wilkinson | |
| 6,033,707 A | 3/2000 | Lanner | |
| 6,036,354 A * | 3/2000 | Bandy | 366/76.6 |
| 6,039,978 A | 3/2000 | Bangs | |
| 6,066,353 A | 5/2000 | Villagran | |
| 6,068,872 A | 5/2000 | Hashiguchi | |
| 6,068,873 A | 5/2000 | Delrue | |
| RE36,785 E | 7/2000 | Colson | |
| 6,139,884 A | 10/2000 | Shifferaw | |
| 6,159,530 A | 12/2000 | Christiansen | |
| 6,207,204 B1 | 3/2001 | Christiansen | |
| 6,210,720 B1 | 4/2001 | Leusner | |
| 6,227,421 B1 | 5/2001 | Richard | |
| 6,287,672 B1 | 9/2001 | Fields | |
| 6,290,999 B1 | 9/2001 | Gerrish | |
| 6,299,914 B1 | 10/2001 | Christiansen | |
| 6,335,048 B1 | 1/2002 | Swarvar | |
| 6,358,544 B1 | 3/2002 | Henry, Jr. | |
| 6,383,533 B1 | 5/2002 | Soeda | |
| 6,419,965 B1 | 7/2002 | Douaire | |
| 6,436,458 B2 | 8/2002 | Kuechle | |
| 6,521,871 B1 | 2/2003 | Shelton | |
| 6,528,768 B1 | 3/2003 | Simic-Glavaski | |
| 6,531,174 B2 | 3/2003 | Barrett | |
| 6,558,730 B1 | 5/2003 | Gisaw | |
| 6,599,547 B1 | 7/2003 | Martinez-Serna Villagran et al. | |
| 6,602,533 B1 | 8/2003 | Smith | |
| 6,607,777 B1 | 8/2003 | Walsh | |
| 6,638,554 B1 | 10/2003 | Rubio | |
| 6,638,558 B2 | 10/2003 | Brubacher | |
| 6,716,462 B2 | 4/2004 | Prosise | |
| 6,770,469 B2 | 8/2004 | Yamaguchi | |
| 6,778,887 B2 | 8/2004 | Britton | |
| 6,828,527 B2 | 12/2004 | Simic-Glavaski | |
| 6,872,417 B1 | 3/2005 | Freudenrich | |
| 6,896,528 B2 | 5/2005 | Kubota | |
| 6,929,812 B2 | 8/2005 | Van Der Doe | |
| 6,989,167 B2 | 1/2006 | Howie | |
| 7,037,540 B2 | 5/2006 | Elder | |
| 7,122,719 B2 | 10/2006 | Hakimi | |
| 7,169,417 B2 | 1/2007 | Lang et al. | |
| 7,189,422 B2 | 3/2007 | Howie | |
| 7,190,813 B2 | 3/2007 | Daley | |
| 7,220,440 B2 | 5/2007 | Dria | |
| 7,267,834 B2 | 9/2007 | Elder | |
| 7,291,380 B2 | 11/2007 | Nyholm | |
| 7,393,550 B2 | 7/2008 | Barry | |
| 7,514,113 B2 | 4/2009 | Zyzak | |
| 7,524,519 B2 | 4/2009 | Zyzak | |
| 7,527,815 B2 | 5/2009 | Teras | |
| 7,534,934 B2 | 5/2009 | Rommens | |
| 7,763,306 B2 | 7/2010 | Barry et al. | |
| 2002/0018838 A1 | 2/2002 | Zimmerman | |
| 2002/0025367 A1 | 2/2002 | Koehler | |
| 2002/0129713 A1 | 9/2002 | Caridis | |
| 2003/0049359 A1 | 3/2003 | Kulkarni | |
| 2003/0183092 A1 | 10/2003 | Barber | |
| 2003/0198725 A1 | 10/2003 | Cardenas | |
| 2003/0219518 A1 | 11/2003 | Li | |
| 2004/0047973 A1 | 3/2004 | Bourhis | |
| 2004/0086597 A1 | 5/2004 | Awad | |
| 2004/0101607 A1 | 5/2004 | Zyzak | |
| 2004/0105929 A1 | 6/2004 | Tomoda | |
| 2004/0109926 A1 | 6/2004 | Tomoda | |
| 2004/0115321 A1 | 6/2004 | Tricoit | |
| 2004/0126469 A1 | 7/2004 | Tomoda | |
| 2004/0131737 A1 | 7/2004 | Tomoda | |
| 2004/0180125 A1 | 9/2004 | Plank | |
| 2004/0180129 A1 | 9/2004 | Plank | |
| 2004/0197012 A1 | 10/2004 | Bourg | |
| 2004/0224066 A1 | 11/2004 | Lindsay | |
| 2004/0265429 A1 * | 12/2004 | Teras et al. | 426/52 |
| 2005/0064084 A1 | 3/2005 | Elder | |
| 2005/0068535 A1 | 3/2005 | Bond | |
| 2005/0074538 A1 | 4/2005 | Elder | |
| 2005/0079254 A1 | 4/2005 | Corrigan | |
| 2005/0118322 A1 | 6/2005 | Elder | |
| 2005/0152811 A1 | 7/2005 | Taylor | |
| 2005/0196504 A1 | 9/2005 | Finley | |
| 2005/0214411 A1 | 9/2005 | Lindsay | |
| 2006/0019007 A1 | 1/2006 | Baas | |
| 2006/0029992 A1 | 2/2006 | Grune et al. | |
| 2006/0088633 A1 | 4/2006 | Barber | |
| 2006/0110503 A1 | 5/2006 | Bates | |
| 2006/0127534 A1 | 6/2006 | Elder | |
| 2006/0193964 A1 | 8/2006 | Eckhoff | |
| 2006/0210693 A1 | 9/2006 | Oftring | |
| 2006/0216376 A1 | 9/2006 | Milici | |
| 2006/0216388 A1 | 9/2006 | Christensen | |
| 2006/0233930 A1 | 10/2006 | Soyka et al. | |
| 2007/0042080 A1 | 2/2007 | Plomp | |
| 2007/0087101 A1 | 4/2007 | Gusek | |
| 2007/0141225 A1 | 6/2007 | Elder | |
| 2007/0141226 A1 | 6/2007 | Elder | |
| 2007/0141227 A1 | 6/2007 | Boudreaux | |
| 2007/0148318 A1 | 6/2007 | Rubio | |
| 2007/0166439 A1 | 7/2007 | Soe | |
| 2007/0178219 A1 | 8/2007 | Boudreaux | |
| 2007/0184175 A1 | 8/2007 | Rubio | |
| 2007/0196556 A1 | 8/2007 | Van Der Meer | |
| 2007/0275153 A1 | 11/2007 | Somsen et al. | |
| 2007/0281062 A1 | 12/2007 | Bourg | |
| 2007/0292589 A1 | 12/2007 | Elder | |
| 2008/0003340 A1 | 1/2008 | Karwowski | |
| 2008/0008780 A1 | 1/2008 | Streekstra | |
| 2008/0101657 A1 | 5/2008 | Durkin | |
| 2008/0138480 A1 | 6/2008 | Bows | |
| 2008/0144880 A1 | 6/2008 | DeLuca | |
| 2008/0166450 A1 | 7/2008 | Corrigan | |
| 2008/0166452 A1 | 7/2008 | Corrigan | |
| 2008/0253648 A1 | 10/2008 | Mulder | |
| 2008/0268111 A1 | 10/2008 | Grune et al. | |
| 2008/0279994 A1 | 11/2008 | Cantley | |
| 2008/0299273 A1 | 12/2008 | Bhaskar | |
| 2009/0047725 A1 | 2/2009 | Elder | |
| 2009/0074915 A1 | 3/2009 | Hendriksen | |
| 2009/0098265 A1 | 4/2009 | Kock | |
| 2009/0191310 A1 | 7/2009 | Zyzak | |
| 2010/0040729 A1 | 2/2010 | Sahagian | |
| 2010/0040750 A1 | 2/2010 | Assaad | |
| 2010/0051419 A1 | 3/2010 | Desai | |
| 2010/0055259 A1 | 3/2010 | Bourg | |
| 2010/0080868 A1 | 4/2010 | Crosby et al. | |
| 2010/0080872 A1 | 4/2010 | Collinge | |
| 2010/0112177 A1 | 5/2010 | Bourg, Jr. | |
| 2010/0143540 A1 | 6/2010 | Bhaskar | |
| 2010/0255167 A1 | 10/2010 | Bourg | |
| 2011/0050880 A1 | 3/2011 | Bourg, Jr. et al. | |

FOREIGN PATENT DOCUMENTS

| | | |
|---|---|---|
| EP | 113940 A1 | 7/1984 |
| EP | 1419702 A1 | 5/2004 |
| EP | 1419703 A1 | 5/2004 |
| ES | 2019044 | 2/1990 |
| FR | 874453 | 8/1942 |
| GB | 156905 | 1/1921 |
| GB | 1132296 | 10/1968 |
| GB | 1519049 | 7/1978 |
| GB | 335214 | 9/1980 |
| JP | 68006927 | 9/1965 |
| JP | 70009815 | 10/1966 |
| JP | 57100179 | 12/1980 |
| JP | 62048351 A | 3/1987 |
| JP | 03175946 | 7/1991 |
| JP | 4104753 | 4/1992 |
| JP | 6030782 A | 2/1994 |
| JP | 06169713 | 6/1994 |
| JP | 05123126 | 5/1998 |
| JP | 10136883 | 5/1998 |
| JP | 11056280 | 3/1999 |
| JP | 11178536 | 7/1999 |
| JP | 11333498 | 12/1999 |

(56) References Cited

FOREIGN PATENT DOCUMENTS

| | | |
|---|---|---|
| JP | 2002180097 | 6/2002 |
| JP | 2004180563 | 7/2004 |
| JP | 2004-313183 | 11/2004 |
| JP | 2004313183 | 11/2004 |
| JP | 2004344691 | 12/2004 |
| JP | 2005278448 | 10/2005 |
| KR | 910006619 B1 | 8/1991 |
| RU | 2048512 | 11/1995 |
| RU | 2078797 | 5/1997 |
| RU | 2140927 | 11/1999 |
| RU | 2216574 | 11/2003 |
| SU | 1822863 | 6/1993 |
| WO | 9601572 | 1/1996 |
| WO | 0004784 | 2/2000 |
| WO | 0191581 | 12/2001 |
| WO | 2004004484 | 1/2004 |
| WO | 2004026043 | 4/2004 |
| WO | 2004028276 | 4/2004 |
| WO | 2004028277 | 4/2004 |
| WO | 2004028278 | 4/2004 |
| WO | 2004032647 | 4/2004 |
| WO | 2004032648 | 4/2004 |
| WO | 2004039174 | 5/2004 |
| WO | 2004040999 | 5/2004 |
| WO | 2004047559 | 6/2004 |
| WO | 2004060078 | 7/2004 |
| WO | 2004080205 | 9/2004 |
| WO | WO 2004089111 A1 * | 10/2004 |
| WO | 2006128843 | 12/2006 |
| WO | 2007106996 | 9/2007 |
| WO | 2008061982 | 5/2008 |

OTHER PUBLICATIONS

Abdel-Kader, Zakia M., "Effect of blanching on the diffusion of glucose from potatoes" (Abstract), Wiley InterScience Journals: Nahrung / Food vol. 36, Iss. 1, 1992, 1 page.

Abstracts of literature search, "Pathway from Asparagine to Acrylamide," 17 pages.

Alternative Medicine Review "Glutathione, Reduced (GSH)" vol. 6, No. 6, 2001, pp. 601-607.

Amrein, Thomas, "Influence of Thermal Processing Conditions on Acrylamide Generation and Browning in a Potato Model System," J. Agric. Food Chem. 2006, 54, pp. 5910-5916.

Ashoor, S.H. & Zent, J.B., "Maillard Browning of Common Amino Acids and Sugars," (Abstract), Wiley InterScience Journals: J. Food Science, vol. 49, Issue 4, Jul. 1984, 2 pages.

Associated Press Washington—"Habrian descubierto el origen de sustancia cancerigena en las papas fritas," Sep. 30, 2002, 2 pages.

Becalski, Adam, et al., "Acrylamide in Foods: Occurrence, Sources, and Modeling," J. Agric. Food Chemistry, 2003, vol. 51, pp. 802-808.

Becalski, Adam, et al., "Acrylamide in French Fries: Influence of Free Amino Acids and Sugars," (Abstract), J. Agric. Food Chem. 52 (12), May 22, 2004, 1 page.

Bosset, Dr. Jacques Olivier, et al. "Mitteilungen aus Lebensmitteluntersuchung und Hygiene" Jun. 2002, vol. 93, Offizielles Organ der Schweizerischen Gesellschaft fur Lebensmittel-und Umweltchemie und der Schweizerischen Gesellschaft fur Lebensmittelhygien(79 pages).

Brathen, Erland, et al., "Addition of Glycine Reduces the Content of Acrylamide in Cereal and Potato Products," J. Agric. Food Chem. 2005, vol. 53, pp. 3259-3264.

CBC News CBC.CA "Food sector told to cut down on toxins in chips, fries" Sep. 19, 2002, 2 pages.

CBC News CBC.CA "Scientists find route for toxin to form in fried, baked foods," Sep. 30, 2002, 3 pages.

CBC News CBC.CA "Some acrylamide with your fries?" Jan. 14, 2003, 6 pages.

Center for Science in the Public Interest article "New Tests Confirm Acrylamide in American Foods," found at http://www.cspinet.org/new/200206251.html, Jun. 25, 2002, 2 pages.

Centre for Molecular and Biomolecular Informatics article "An Amino Acid Bedtime Story" found at http://www.cmbi.kun.nl.gvteach/HAN/alg/infopages/bedtime.html, material from Friedli Enterprises, Gert Vriend, Apr. 18, 2000, 4 pages.

chemhelper.com Home Page for Frostburg State University—Organic Chemistry Help, article "Nucleophilic Addition to Carbonyl Groups" found at http://www.chemhelper.com/nucadd.html, 2000 (3 pages).

Claeys, Wendie L., et al. "Quantifying the formation of carcinogens during food processing: acrylamide," Trends in Food Science & Technology 16 (2005), pp. 181-193.

Database WPI Week 199329 Derwent Publications Ltd., London, GB; AN 1993-234163 XP002473734 & SU 1 750 586 A1 (Interbios Res Assoc) Jul. 30, 1992, 1 page.

Database WPI Week 199805 Thomson Scientific, London, GB; AN 1998-042903 XP002503379, Dec. 4, 1996, 1 page.

de Barber, C. Benedito de, et al. "Reversed-Phase High-Performance Liquid Chromatography Analysis of Changes in Free Amino Acids During Wheat Bread Dough Fermentation" Cereal Chemistry, Feb. 26, 1989, vol. 66, No. 4, pp. 283-288.

de Meulenaer, Bruno, et al., "Comparison of Potato Varieties Between Seasons and Their Potential for Acrylamide Formation," J. Science Food Agric., vol. 88, 2008, pp. 313-318.

de Vleeschouwer, Kristel, et al., "Impact of pH on the Kinetics of Acrylamide Formation/Elimination Reactions in Model Systems," J. Agric. Food Chem. vol. 54, 2006, pp. 7847-7855.

de Wilde, Tineke, et al., "Influence of Fertilization on Acrylamide Formation during Frying of Potatoes Harvested in 2003," J. Agric. Food Chem., 2006, vol. 54, pp. 404-408.

Dunlop, Patricia C., et al. "Nitrogen Catabolite Repression of Asparaginase II in *Saccharomyces cerevisiae*" J. Bacteriology, Jul. 1980, vol. 143, No. 1, pp. 422-426.

El Pais.com, "Hallada la reaccion quimica que produce la acrilamida en las frituras," Jul. 15, 2009, 1 page.

European Commission—Health and Consumer Protection Directorate-General, "Opinion of the Scientific Committee on Food on new findings regarding the presence of acrylamide in food," Jul. 3, 2002, 16 pages.

European Food Safety Authority, Report of "Workshop on Acrylamide Formation in Food," Nov. 17, 2003, Brussels, 22 pages.

"FAO/WHO Joint Consultation on the Health Implications of Acrylamide in Food" Summary Report, Geneva, Switzerland, Jun. 25-27, 2002, 12 pages.

Food Safety Consultations "Health Implications of Acrylamide in Food" Report of a Joint FAO/WHO Consultation, Geneva, Switzerland, Jun. 25-27, 2002, 38 pages.

Joint FAO/WHO Expert Commission on Food Additives, 64th Meeting, Rome, Feb. 8-17, 2005, 47 pages.

Fan, Xuetong, et al. "Effectiveness of Ionizing Radiation in Reducing Furan and Acrylamide Levels in Foods" J. Agric. Food Chem. 2006, 54, pp. 8266-8270.

Fiselier, K., et al., "Brown potato Croquettes Low in Acrylamide by Coating with Egg/Breadcrumbs," Eur. Food Res. Technol. (2004) 219:111-115.

Fiselier, Katell, et al., "Higher Acrylamide Contents in French Fries Prepared from "Fresh" Prefabricates," Eur. Food Res. Technol. (2005) 221:376-381.

Food Standards Agency, "Study of Acrylamide in Food," May 17, 2002, 7 pages.

Francis, Frederick J., "Encyclopedia of Food Science and Technology," 2nd ed., 2000, pp. 2160-2161.

Freshfields Bruckhaus Deringer "Acrylamide in food—The approach of regulators across Europe" Feb. 2003 (20 pages).

Friedman, Mendel, et al., "Browning prevention in fresh and dehydrated potatoes by SH-containing amino acids," Food Additives and Contaminants, 1992, vol. 9, No. 5, pp. 499-503.

Friedman, Mendel, "Chemistry, BioChemistry, and Safety of Acrylamide. A Review," J. Agric. Food Chem., Jul. 3, 2003, vol. 51 (16), pp. 4504-4526.

Friedman, Mendel, et al., "Inhibition of Browning by Sulfur Amino Acids. 1. Heated Amino Acid-Glucose Systems," J. Agric. Food Chem., 1990, 38, pp. 1641-1647.

(56) References Cited

OTHER PUBLICATIONS

Friedman, Mendel "The Impact of the Maillard Reaction on the Nutritional Value of Food Proteins" Ch. 6 from The Maillard Reaction: Consequences for the Chemical and Life Sciences, Ikan, Raphael (ed.), 1996, 24 pages.

Garayo, Jagoba, et al. "Vacuum frying of potato chips" J. Food Engineering 55 (2002), pp. 181-191.

Gertz, Christian, et al. "Analysis of acrylamide and mechanisms of its formation in deep-fried products" Eur. J. Lipid Sci. Technol. 104 (2002), pp. 762-771.

Gokmen, Vural, et al., "Acrylamide formation is prevented by divalent cations during the Maillard reaction," Food Chemistry (2006) doi: 10.1016/j.foodchem. Aug. 11, 2006, 8 pages.

Granda, Claudia, et al., "Effect of Raw Potato Composition on Acrylamide Formation in Potato Chips," J. Food Science vol. 70, Nr. 9, 2005, Nov. 16, 2005, pp. E519-E525.

Granda, Claudia, et al. "Kinetics of Acrylamide Formation During Traditional and Vacuum Frying of Potato Chips" J. Food Process Engineering 28 (2005), pp. 478-493.

Granda, C., et al. "Reduction of Acrylamide Formation in Potato Chips by Low-temperature Vacuum Frying", J. Food Science, vol. 69, Nr. 8, 2004, Oct. 7, 2004, pp. E405-E411.

Grivas, Prof. Spiros, et al. "Acrylamide in Food—Mechanisms of Formation and Influencing Factors During Heating of Foods", Report from Swedish Scientific Expert Committee, Apr. 24, 2002 (22 pages).

Harmony House Foods, Inc., http://web.archive.org/web/20050425210612/www.harmonyhousefoods.com/slicedpotato.html, Apr. 25, 2005, 2 pages.

Harrison, Karl "Amino Acids and Proteins" found at http://www.chem.ox.ac.uk/mom/amino_acids/introduction.html, 1996 (2 pages).

Harrison, Karl "Molecules of the Month" found at http://www.chem.ox.ac.uk/mom/, 1996 (1 page).

Health Canada Food & Nutrition "Acrylamide and Food" Dec. 1, 2005 (3 pages).

Health Canada Food & Nutrition "Major pathway of formation of acrylamide in foods and possible approaches to mitigation" Mar. 11, 2005 (2 pages).

Health Canada OCAPI Involving You publication, "Acrylamide and Food," vol. 2, No. 1, Autumn 2002, 2 pages.

Heldman, Dennis R., et al. "Principles of Food Processing" book, 1997, p. 193.

Hughes B.P. "The amino acid composition of potato protein and of cooked potato" British J. of Nutrition, vol. 12, Issue 02, May 1958, pp. 188-195.

Igoe, Robert, Dictionary of Food Ingredients, 4th ed., (Aspen Publishers 2001), pp. 24, 35, 43, 109, and 167.

Institute of Food Science & Technology (UK) "Acrylamide Information and News" found at http://www.ifst.org/acrylmd.htm Sep. 6, 2002, 5 pages.

Ishihara, Katsuyuki, et al. "Examination of Conditions inhibiting the Formation of Acrylamide in the Model System of Fried Potato" Biosci. Biotechnol. Biochem., 70(7), 2006, pp. 1616-1621.

Jacobs, Morris B., Ph.D. "The Chemistry and Technology of Food and Food Products" textbook, 1951, pp. 221-226.

Jespersen, Neil "Chemistry" from Barron's College Review Series on Science, 1997, p. 210.

Jung, M.Y. et al. "A Novel Technique for Limitation of Acrylamide Formation in Fried and Baked Corn Chips and in French Fries", J. Food Science vol. 68, No. 4, 2003, pp. 1287-1290.

Kim, Kyu-Won, et al. "Asparaginase II of *Saccharomyces cerevisiae*" J. Biological Chem. 263 (24), Aug. 25, 1988, pp. 11948-11953.

Kim, Cheong Tae, et al. "Reducing Acrylamide in Fried Snack Products by Adding Amino Acids" J. Food Science vol. 70, Nr. 5, 2005, pp. C354-C358.

Kirk, Raymond E., et al. "Enciclopedia de Tecnologia Quimica" 1962, pp. 986-998.

Kita, Agnieszka, et al. "Effective Ways of Decreasing Acrylamide Content in Potato Crisps During Processing" J. Agric. Food Chem., Oct. 15, 2004, vol. 52, pp. 7011-7016.

Kretovich, V.L. "Plant Biochemistry" book, 1986, pp. 8-11 (English translation).

Lawrence, James E., "Acrylamide in Food" memorandum, Health Canada Food Program publication, Sep. 23, 2002, 1 page.

Low, Mei Yin, et al. "Effect of Citric Acid and Glycine Addition on Acrylamide and Flavor in a Potato Model System" J. Agric. Food Chem. 2006, 54, pp. 5976-5983.

Martin, Fiona L., et al. "Formation of Strecker Aldehydes and Pyrazines in a Fried Potato Model System" J. Agric. Food Chem. 2001, 49, pp. 3885-3892.

May, N.J., et al. "Acrylamide formation in deep-fried potato products and removal of acrylamide precursors" Food Australia 58 (10) Oct. 2006, pp. 488-493.

Mizukami, Yuzo, et al. "Analysis of Acrylamide in Green Tea by Gas Chromatography—Mass Spectrometry" J. Agric. Food Chem. 2006, 54, pp. 7370-7377.

Mottram, Don—The University of Reading, "Acrylamide in Cooked Foods—the Latest 'Food Scare'" 2002 (44 pages).

Mottram, Donald S. "Acrylamide is formed in the Maillard reaction" Nature Magazine, Oct. 3, 2002, found at www.nature.com/nature (1 page).

Murray, Lindsay, "Acrylamide" Center for Clinical Toxicology, Vanderbilt Univ. Med. Ctr., Jul. 1996 found at http://www.inchem.org/documents/pims/chemical/pim652.htm, Jun. 1998 (8 pages).

Mustafa, Arwa, et al. "Factors Influencing Acrylamide Content and Color in Rye Crisp Bread" J. Agric. Food Chem. 2005, 53, pp. 5985-5989.

Neergaard, Lauran "Scientists: Chemical Reaction May Create Carcinogen" Health Zone found at http://www.cjonline.com/stories/093002/hea_carcinogen.shtml, Sep. 30, 2002 (3 pages).

Nielsen, Per Munk "Enzyme Technology for Production of Protein-Based Flavours" Novo Nordisk A/S 1995 (6 pages).

Ou, Shiyi, et al. "Reduction of Acrylamide Formation by Selected Agents in Fried Potato Crisps on Industrial Scale" ScienceDirect, Innovative Food Science and Emerging Technologies 9 (2008) pp. 116-121.

Pedreschi, Franco, et al. "Acrylamide reduction under different pretreatments in French fries" ScienceDirect Journal of Food Engineering 79 (2007) pp. 1287-1294.

Pedreschi, Franco, et al. "Color development and acrylamide content of pre-dried potato chips" ScienceDirect Journal of Food Engineering 79 (2007) pp. 786-793.

Pedreschi, Franco, et al. "Color kinetics and acrylamide formation in NaCl soaked potato chips" ScienceDirect Journal of Food Engineering 79 (2007) pp. 989-997.

Pedreschi, Franco, et al. "Reduction of Acrylamide Formation in Potato Slices During Frying" Lebensm.-Wiss u.-Technol. 37 (2004) pp. 679-685.

Procter & Gamble Press Release Sep. 27, 2002 "Procter & Gamble Makes Significant Advances on Understanding Acrylamide Formation" found at http://biz.yahoo.com/prnews/020927/clf005_1.html (2 pages).

Raloff, Janet, "Hot Spuds: Golden Path to Acrylamide in Food" Science News Online, Oct. 5, 2002, vol., 162 found at http://www.sciencenews.org/20021005/fob5.asp (3 pages).

Rossell, J.B. (ed.) "Frying—Improving Quality" CRC Press, 2001, pp. 198-214 and 306-308.

Rydberg, Per, et al. "Investigations of Factors That Influence the Acrylamide Content of Heated Foodstuffs" J. Agric. Food Chem. 2003, vol. 51, pp. 7012-7018.

Sanders, R.A., et al. "An LC/MS Acrylamide Method and Its Use in Investigating the Role of Asparagine," printout of presentation slides (24 pages).

Segtnan, Vegard H., et al. "Screening of acrylamide contents in potato crisps using process variable settings and near-infrared spectroscopy" Mol. Nutr. Food Res. vol. 50, 2006, pp. 811-817.

Stadler, Richard H., et al. "Acrylamide from Maillard reaction products" Nature Magazine Oct. 3, 2002 found at www.nature.com/nature (2 pages).

Talburt & Smith (eds.), Potato Processing 4th Ed. 1987, Ch. 12 "Dehydrated Mashed Potatoes—Potato Granules," pp. 535-555.

Talburt & Smith (eds.), Potato Processing 4th Ed. 1987, "Improving the Color of Potato Chips," pp. 403-405.

(56) References Cited

OTHER PUBLICATIONS

Tareke, Eden, et al., "Analysis of Acrylamide, a Carcinogen Formed in Heated Foodstuffs," J. Agric. Food Chem. pages A through I.
"Temperature and Heat—Local Materials" Mar. 2003 found at http://web.archive.org/web/20030321105136/http://www.pa.uky.edu/sciworks/xtra/local.htm (3 pages).
U.S. Dept. of Health and Human Services, Public Health Service, National Toxicology Program, "9th Report on Carcinogens Revised Jan. 2001" found at http://win2000.kreatiweb.it/sanitaweb/web/Biblioteca/carcinogens/rahc/acrylamide.pdf (5 pages).
U.S. Dept. of Health & Human Services, U.S. Food and Drug Adm., Center for Food Safety and Applied Nutrition. "Exploratory Data on Acrylamide in Foods" Dec. 4, 2002 found at http://www.mindfully.org/food/acrylamide-foods-fda (9 pages).
U.S. Food and Drug Administration Public Meeting "Assessing Acrylamide in the U.S. Food Supply," Sep. 30, 2002(5 pages).
Viklund, Gunilla A., et al., "Variety and Storage Conditions Affect the Precursor Content and Amount of Acrylamide in Potato Crisps," J. Sci. Food Agric. 2008, vol. 88, pp. 305-312.
Vivanti, Vittorio, et al. "Level of Acrylamide Precursors Asparagine, Fructose, Glucose, and Sucrose in Potatoes Sold at Retail in Italy and in the United States" J. Food Science, vol. 71, Nr. 2, 2006, pp. C81-C85.
Watson, S.A. (ed.), Corn: Chemistry and Technology, American Association of Cereal Chemists, 1987, pp. 410-420.
Webb, Edwin C., "Enzyme Nomenclature 1992," Academic Press, p. 422.
Weisshaar, Rudiger, et al. "Formation of Acrylamide in Heated Potato Products—Model Experiments Pointing to Asparagine as Precursor" Pub. Oct. 3 2002, Deutsche Lebensmittel-Rundschau 98 Jahrgang, Heft (4 pages).
Williams, J.S.E., "Influence of Variety and Processing Conditions on Acrylamide Levels in Fried Potato Crisps," ScienceDirect Food Chemistry 90 (2005), pp. 875-881.
"Working Group 1: Mechanisms of Formation of Acrylamide in Food" Summary Report(7 pages).
Wulfsberg, Gary, Inorganic Chemistry book, University Science Books, 2000,p. 289.
Yarnell, Amanda, "Acrylamide Mystery Solved," Chemical & Engineering News, Oct. 4, 2002 found at http://pubs.acs.org/cen/today/oct4.html (3 pages).
Yaylayan, Varoujan A., et al., "Why Asparagine Needs Carbohydrates to Generate Acrylamide," J. Agric. Food Chem. 2003, vol. 51, pp. 1753-1757.
Zhang, Yu, et al., "Study on Formation of Acrylamide in Asparagine-Sugar Microwave Heating Systems Using UPLC-MS/MS Analytical Method," ScienceDirect, Food Chemistry 108 (2008), pp. 542-550.
Zyzak David V. et al., "Acrylamide Formation Mechanism in Heated Foods," J. Agric. Food Chem. 2003, vol. 51, pp. 4782-4787.
Zyzak, David, et al. v. Elder, Vincent Allen, et al., Board of Patent Appeals and Interferences, Judgment-Arbitration-Bd.R. 126(f),Apr. 14, 2008, 2 pages.
NFRI Report, published Jul. 1, 2004, Report on the symposium named "Chemistry and Safety of Acrylamide in Food" held by the Agricultural and Food Chemistry Division of the American Chemical Society held on Mar. 28-31, 2004 in Anaheim, CA, USA, published by the National Food Research Institute (NFRI) of the National Agricultural and Food Research Organization of Japan (NARO), available at http://oasys2.confex.com/acs/227nm/techprogram/D941.HTM.
Summary Report of "2004 Acrylamide in Food Workshop: Update—Scientific Issues, Uncertainties, and Research Strategies," held on Apr. 13-15, 2004 in Chicago, IL, USA, published on Aug. 6, 2004, by the National Food Research Institute (NFRI) of the National Agricultural and Food Research Organization of Japan (NARO), available at http://222.jifsan.umd.edu/docs/acry2004.
Decision of Rejection, Japanese Pat. App. No. 2007-544461 dated Mar. 16, 2010, translated into English (2 pages).
"Kagaku Dai-jiten (Encyclopedia of Chemistry)," edited by Ohki Michinori, et al., 1989, pp. 317, 96, and 1661 (6 pages).
"Shokuhin Tenkabutsu Binran (List of Food Additives)," 1964, p. 249 (2 pages).
Standard Electrode Potentials, http://www.benjamin-mills.com/chemistry/ecells.htm (2 pages).
AFSSA, French Food Safety Agency, "Acrylamide: Information Point," Jul. 24, 2002 (11 pages).
Martinez-Bustos, F., "Effect of the components of maize on the quality of masa and tortillas during the traditional nixtamalisation process," Journal of the Science of Food and Agriculture, vol. 81, pp. 1455-1462, Aug. 13, 2001, 8 pages.
Sefa-Dedeh, S., "Effect of nixtamalization on the chemical and functional properties of maize," Food Chemistry, vol. 86, pp. 317-324, Aug. 14, 2003, 8 pages.
Dobarganes, Carmen, et al., "Interactions between fat and food during deep-frying," Eur. J. Lipid Sci. Tech. 2000, vol. 102, pp. 521-528.
Erickson, Michael D., ed., Book entitled "Deep Frying—Chemistry, Nutrition and Practical Applications," 2d edition, pp. 262, 263, 274, 275.
Farid, M.M., et al., "The analysis of heat and mass transfer during frying of food using a moving boundary solution procedure," Heat and Mass Transfer, vol. 34, 1998, pp. 69-77.
Fleck, Fiona, "Experts launch action on acrylamide in staple foods," British Medical Journal, Jul. 20, 2002, p. 120.
Jackson, Lauren, "Formation of acrylamide in food," US FDA Centre for Food Safety and Applied Nutrition, National Centre for Food Safety and Technology, Summit—Argo, IL, Dec. 4-5, 2002 presentation, 32 pages.
Lotfi, Ehsan, et al. "A new approach for automatic quality control of fried potatoes using machine learning," Islamic Azad University, Mashad Branch, Ferdowsi University of Mashad, Khorasan Research Center for Technology Development, Mar. 11, 2009, 4 pages.
Pedreschi, Franco, et al. "Acrylamide content and color development in fried potato strips," ScienceDirect Journal of Food Engineering 39 (2006) pp. 40-46.
Research Disclosure 15172, New process for the manufacture of potato-chips from different types of potatoes (not selected), Nov. 1976, 1 page.
Talburt & Smith (eds.), Potato Processing 4th Ed. 1987, "Improving the Color of Potato Chips," pp. 406-413.
Tareke, E., et al., "Acrylamide: A Cooking Carcinogen?" Chem. Res. Toxicol. 2000, vol. 13, pp. 517-522, Published on Web May 27, 2000 (6 pages).
Stark, Jeffrey C., et al., "Tuber Quality"date unknown, found at http://www.cals.uidaho.edu/potato/PotatoProductionSystems/Topics/TuberQuality.pdf 15 pages.
Weaver, M.L., et al., "Sugar-End in Russet Burbank Potatoes," American Journal of Potato Research, 1972, vol. 49, No. 10, pp. 376-382.
Distasio, J., and Niederman, R., "Purification and Characterization of L-Asparaginase with Anti-lymphoma Activity from *Vibrio* succinogenes," Nov. 25, 1976, Journal of Biological Chemistry, vol. 251, No. 22, pp. 6929-6933 (5 pages).
Biedermann, Maurus, et al., "Experiments on Acrylamide Formation and Possibilities to Decrease the Potential of Acrylamide Formation in Potatoes," Mitt. Lebensm. Hyg. 93 (2002), XP009008943, 20 pages.
Coffin, "Effect of Low Temperature Storage on Sugar Concentrations and Chip Color of Certain Processing Potato Cultivars and Selections," Journal of Food Science, 52: 639-645, 1987, 7 pages.
English machine translation of JP11-333498, published Dec. 7, 1999, Inventor Hattori Toshimitsu, 16 pages.
English machine translation of JP2002-180097, published Jun. 26, 2002, Inventor Ide Kazutoshi, 11 pages.
English machine translation of JP2004-344691, published Dec. 9, 2004, Inventor Saito Shuichi, 6 pages.
Note of the Meeting of Experts on Industrial Contaminants in Food (European Commission): Acrylamide Workshop, Oct. 20-21, 2003, "Information on Ways to Lower the Levels of Acrylamide Formed in Food," 6 pages.
Robert, Fabien, et al., "Acrylamide Formation From Asparagine Under Low-Moisture Maillard Reaction Conditions. 1. Physical and Chemical Aspects in Crystalline Model Systems," J. Agric. Food Chem., 2004, vol. 52, pp. 6837-6842, 6 pages.
Zhu, Fan, et al., "Compositions of phenolic compounds, amino acids and reducing sugars in commercial potato varieties and their effects on acrylamide formation," J. Sci. Food Agric., vol. 90, No. 13, Jul. 13, 2010, pp. 2254-2262, XP055128100, 10 pages.

\* cited by examiner

METHOD AND SYSTEM FOR THE DIRECT INJECTION OF ASPARAGINASE INTO A FOOD PROCESS

BACKGROUND OF THE INVENTION

1. Technical

The present invention relates to a system and method for the direct injection of an additive into a food manufacturing process to reduce the level of acrylamide in the resultant food product.

2. Description of Related Art

As discussed in U.S. Patent Application Publication No. 2004/0265429, acrylamide has been found in thermally-processed foods containing asparagine. The level of acrylamide formed in some food products can be reduced by adding the enzyme asparaginase to the food product prior to cooking the food product.

The addition of acrylamide reducing enzymes such as asparaginase to food products on a commercial scale, as opposed to a batch scale, presents several challenges. For example, the enzyme asparaginase must contact free asparagine to facilitate the hydrolysis of asparagine. As the enzyme is typically supplied in a relatively concentrated form (e.g., about 48% deionized water, about 48% glycerol, about 4% enzyme by weight), the enzyme is diluted with chlorinated water prior to contacting the food product with the enzyme solution. The prior art teaches that the enzyme should be added as part of a diluted solution to facilitate the homogenous addition and complete distribution of enzyme to react with asparagine throughout the food material. The water for such dilution is typically chlorinated tap water supplied by a municipal water supply.

A known way to quantify the activity of an enzyme is by referring to the enzyme in terms of units. One unit of enzyme activity is defined as the amount of enzyme required as a catalyst to convert one micromole of substrate in one minute. Thus, knowing the relative concentration of a substrate or compound such as asparagine in a food product, and the amount of food product, one can calculate the units of enzyme, such as asparaginase, required to convert the desired chemical compound, in this case, asparagine, into a different chemical compound.

However, when excess doses (meaning more than the mathematically expected amount required to convert all the asparagine in the food product) of the diluted asparaginase enzyme are used in a food product, such as potato mash or corn masa, there oftentimes are still measurable levels of asparagine in the dough. Because it is desired to reduce the level of acrylamide formed when certain foods are thermally processed, it would be desirable to have a system and method of maximizing the effectiveness of an enzyme used to reduce acrylamide pre-cursors in food products made on a commercial scale.

SUMMARY OF THE INVENTION

The present invention, in one aspect, is directed towards a system and method of the direct injection of a concentrated additive to a food product. In one aspect, a concentrated enzyme such as asparaginase is added directly to a dough. In one aspect, the system can be used to add other acrylamide reducing agents in concentrated form to the dough. The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

In the present invention, the food product in which it is desired to reduce the level of acrylamide formed upon thermal processing is formed from a dough. In one embodiment, the present invention is directed towards adding a concentrated liquid additive such as liquid asparaginase simultaneously with added water and starch-based ingredients to make an asparagine deficient dough. As used herein, "an asparagine deficient dough" is defined as a dough having less than its native content of asparagine due to destruction of the asparagine from an asparaginase or other suitable enzyme. As used herein, "a concentrated liquid additive" is defined as an additive in a liquid matrix having no "drinking water." The concentrated additive can, however, have purified water. As used herein the term "purified water" is water that is substantially free of chlorine and includes, but is not limited to, deionized water, distilled water, and water that has been treated to remove oxidizing forms of chlorine. The invention can be used in a batch operation by injecting a set amount of a concentrated liquid additive to dough ingredients or can be used in a continuous operation by injecting set rate of a concentrated liquid additive to dough ingredients.

As used herein, "drinking water" is synonymous with "chlorinated drinking water" and shall mean the water supplied from a potable water supply, and includes, but is not limited to, water from a municipal water supply. The language "consisting essentially of" is intended to indicate that no added water, as that term is defined below, is intentionally added to the concentrated additive prior to the addition of the concentrated additive to a food ingredient. As used herein, the term "added water" refers to "drinking water" which has been added to dough ingredients and includes, for example, mill water added to a corn mill. As used herein, "dry ingredients" are food ingredients such as flours or starches that have a moisture content of less than about 15% by weight.

In a commercial facility, the added water used to mix with dry ingredients to form a dough is that water that is readily available to the facility, which is typically the drinking water supplied to an end-user from the local municipal water supply. Most municipal water supplies add enough chlorine to drinking water so the drinking water has residual chlorine at the customer's tap. Many municipal water districts add chloramine to drinking water because chloramine is more stable than chlorine. As used herein, chlorine is defined as oxidizing forms of chlorine and includes, but is not limited to chloramine and hypochlorites. Similarly, non-oxidizing forms of the chloride ion, such as provided by hydrochloric acid (HCl) and sodium chloride (NaCl), are excluded from the definition.

Certain characteristics of drinking water, for example, the presence of chlorine, reduces the activity of the asparaginase enzyme to a point where it is not useful in a commercial setting for the production of food. The following test reveals the impact that drinking water can have on asparaginase activity.

Two aliquots having an initial equal Asparaginase Activity were diluted equally with deionized water and drinking water to make a first asparaginase solution and a second asparaginase solution. Each solution was held for 30 minutes at room temperature and then each asparaginase solution was then added to fresh corn masa. Asparagine in the masa was measured 5 minutes and 10 minutes after the enzyme was added to the fresh corn masa and the values measured are shown in Table 1 below.

TABLE 1

Asparagine level in corn masa using enzyme mixed with drinking water and deionized water.

| Type of Water Used for Enzyme Dilution | Masa Sample | Asparagine (ppm) |
|---|---|---|
| Deionized water | 5 minutes after first asparaginase solution added | 3.6 |
| Deionized water | 10 minutes after first asparaginase solution added | 2.9 |
| Drinking water from the North Texas Municipal Water District to Plano, TX USA | 5 minutes after second asparaginase solution added | 37.2 |
| Drinking water from the North Texas Municipal Water District to Plano, TX USA | 10 minutes after second asparaginase solution added | 24.2 |

The level of asparagine in the fresh corn masa shown in Table 1 above demonstrates that the resultant level of asparagine is highly dependent on the underlying diluted asparaginase solution. As revealed by Table 1 above, the corn masa sample mixed with the deionized asparaginase solution had about one tenth the asparagine level of the corn masa mixed with the drinking water. The data shown above clearly indicates that the residence time with chlorinated water should be minimized to maximize residual enzyme activity.

One embodiment of the present invention provides a system that minimizes the amount of time that asparaginase is in contact with drinking water and thereby maximizes the asparaginase activity, which results in lower asparagine levels in corn masa and thereby provides an asparagine deficient dough.

Figure 1:
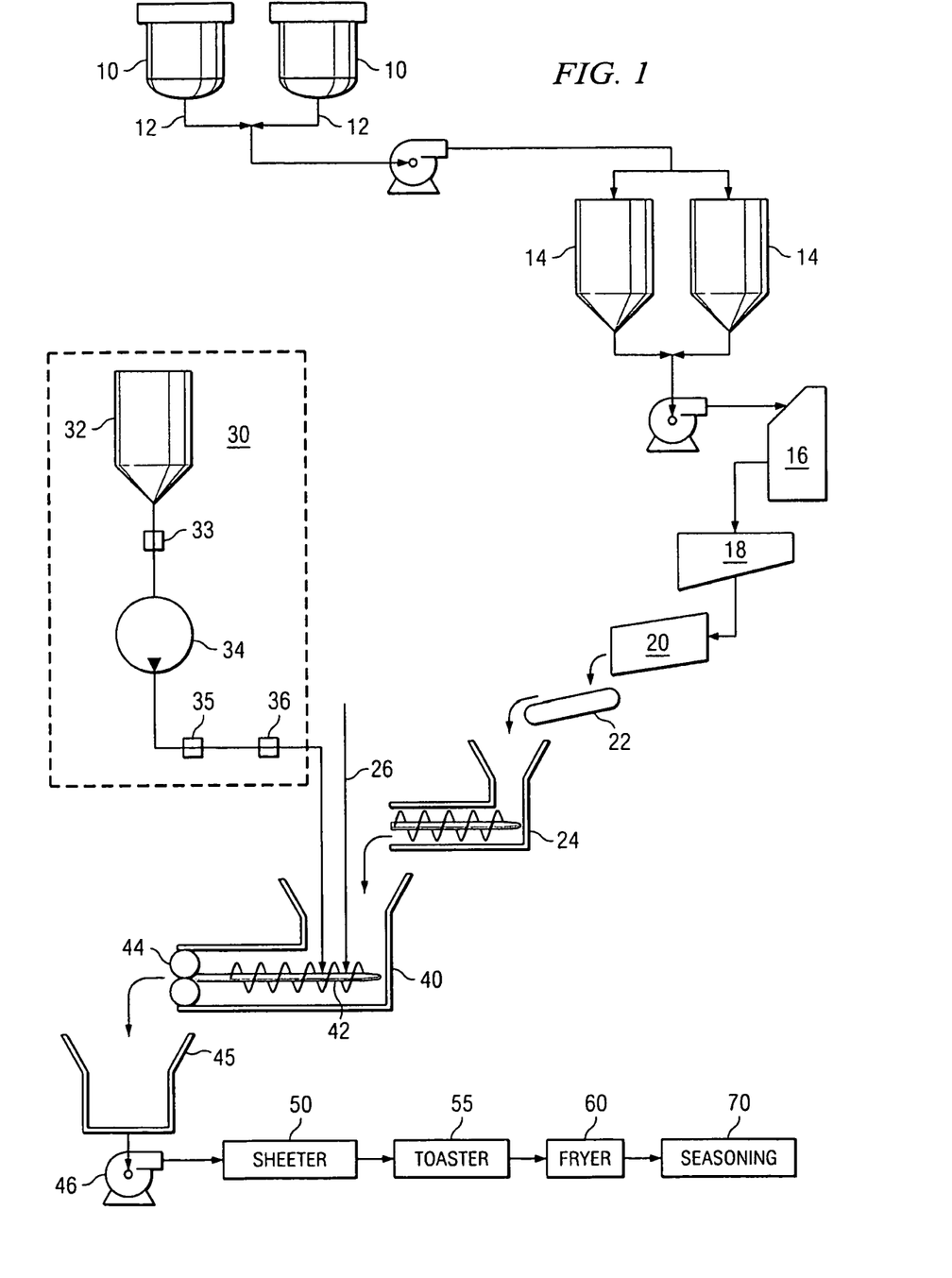
FIG. 1 is a schematic diagram illustrating one embodiment of the present invention as applied to a manufacturing process for making tortilla chips.

FIG. 1 is a schematic diagram illustrating an embodiment of the present invention as applied to a manufacturing process for making tortilla chips. The process starts by placing corn, lime, and water into a steam-jacketed kettle 10. This mixture is then heated to its cook temperature for a set number of minutes. Following the cook, water is added to the kettle 10 to cool the batch. The kettle of corn-slurry is then pumped via a discharge line 12 to a soak tank 14 to be "steeped" or soaked. After the corn-slurry has been steeped in the soak tank 14, the slurry is sent to a hydrosieve 16. The hydrosieve 16 separates corn and water. The corn is then fed via a corn hopper 18 and then routed into a corn washer 20. The washer is used to gently rinse the corn of loosened hulls/loosened pericarp and lime. From the washer 20, the de-hulled washed corn is routed to a drain belt 22 to drain excess water from the de-hulled washed corn. The de-hulled washed corn having a moisture content of between about 42% to about 46% can then be sent to a corn hopper 24 and then routed to a corn mill 40.

In one embodiment, the corn mill 40 has an auger 42 that forces the washed corn into the millstones 44, which mill and grind the corn slurry. Mill water 26, typically sourced from a municipal water supply, is added to the auger 42 with the washed corn exiting the corn hopper 24 to obtain dough consistency. The moisture content of the corn in the mill 40 is between about 48% to about 54% by weight. In the embodiment shown, a direct injection system 30 is used to inject concentrated enzyme directly into the corn mill 40 auger 42 that feeds the millstones 44 rather than first mixing the mill water 26 with the concentrated enzyme.

In one embodiment, the direct injection system 30 comprises an enzyme tank 32 to hold concentrated enzyme and a precision pump 34 to transfer concentrated enzyme from the holding tank 32 into the corn mill 40. A pump such as a NOVOSPENSE pump available from Car-May LLC of Berthoud, Colo., USA can be used. Such pump can accurately and precisely deliver small amounts of concentrated enzyme. In one embodiment, the precision pump 34 delivers an amount within one percent of the amount it is set to deliver. For example, in one embodiment if the precision pump 34 is set to deliver 100 ml on a batch or continuous basis, the pump actually delivers 100 ml±1.0 ml. In one embodiment, the precision pump 34 is capable of a 500:1 turndown ratio. Such precision pump 34 can work in a batch or continuous process. In one embodiment, the precision pump 34 injects between about 20 ml and about 10000 ml per hour of a concentrated asparaginase having an activity of between about 1000 units per gram and about 4000 units per gram. In one embodiment, the precision pump 34 injects between about 20 ml and about 10000 ml per hour of a concentrated asparaginase having an activity of between about 1000 units per gram and about 4000 units per gram per 1800 pounds to 6000 pounds per hour of dough. In one embodiment, the pump 34 discharges between about 5 drops and about 2500 drops per minute of a concentrated enzyme through the terminal end of the tubing and into the corn hopper 40.

In one embodiment, one or more of the lines carrying concentrated enzyme between the enzyme tank 32 and the corn mill 40 are comprised of one-eighth inch OD or one-quarter inch OD tubing. In one embodiment, one-quarter inch OD tubing having a wall thickness of 0.032 inches can be used between the tank 32 and the precision pump 34 and one-eighth inch tubing is used from the precision pump 34 past the flow switch 36 to the edge of the skid. From the edge of the skid to the auger 42 one-quarter inch heavy wall tubing having a wall thickness of 0.065 inches can be used. The use of such heavy wall tubing helps to minimize the volume between the pump skid and the corn mill auger 42 which minimizes waste during shutdown. Further, the time to fill the tubing during start-up can also be minimized.

A foreign matter filter 33 can be used upstream of the pump 34 to capture any particulate contaminants and help ensure accuracy and precision of the pump 34. A discharge filter 35 can optionally be used to capture any particulate contaminants. A flow meter or flow switch 36, available from companies such as Micro Motion of Boulder, Colo., can also be used to verify that enzyme is being discharged through the tubing into the corn mill auger 42. In one embodiment, the flow switch 36 is tied into the PLC control system such that if no flow through the flow switch 36 is indicated, all unit operations upstream of and including the millstones 44 are shutdown to ensure that all ground corn is treated with enzyme.

In one embodiment, the enzyme tank 32 comprises a low level sensor to signal when additional enzyme is needed in the enzyme tank 32. In one embodiment, the enzyme tank 32 comprises a low low level sensor to signal that the enzyme tank 32 is empty. Such signal is tied into a PLC control system and turns off the precision pump 34 and all unit operations upstream of and including the millstones 44.

As evidenced by Table 1 above, the enzyme activity decreases more rapidly with time as the enzyme is exposed to drinking water. Thus, any chlorine in the mill water 26 can decrease the enzyme activity of the enzyme added to the corn mill 40. However, the direct injection of the enzyme directly to the corn mill advantageously minimizes the contact time with the mill water 26.

The rotating auger 42 forces the concentrated enzyme, the washed corn, and mill water 26 into the millstones 44. In one embodiment, the contact time of the enzyme with the milled corn is the residence time of the ground corn/enzyme mixture in the hog 45, through the masa pump 46 and transfer lines, through the sheeter 50, and until shortly after the pre-forms enter the toaster 55. The toast oven typically operates at temperatures higher than the deactivation temperature (82° C./180° F.) of the enzyme. In one embodiment, the contact time between the ground corn and the enzyme is between about 3 minutes and about 10 minutes. Because the mill water 26 and concentrated enzyme are added via different streams to the corn mill auger 42 there is less time for the mill water, typically having chlorine and other potential enzyme activity reducing substances, to reduce the activity of the enzyme prior to the enzyme contacting with the asparagine in the ground corn. Thus, while the enzyme activity is decreasing after the addition to the corn mill 40, the enzyme activity is still sufficient to facilitate hydrolysis of the asparagine. Further, contact with the asparagine is further enhanced because of the grinding action provided by the millstones 44 breaks down the cell walls and promotes contact between the asparagine and asparaginase. Consequently, contact between asparagine and asparaginase is enhanced after the millstones 44 because of the grinding action.

The asparagine deficient milled corn from the hog 45 is then routed by a masa pump 46 to a sheeter 50 where the dough is sheeted and cut into pre-forms. The pre-forms are then routed to a toaster 55, a fryer 60 and then cooked in hot oil having a temperature between about 340° F. to about 370° F. to a moisture content of between about 0.8% and about 2.0%. The cooked chips can then be routed for seasoning 70.

Although the acrylamide reduction will be dependent upon a number of factors, Applicants have found that the direct injection of a concentrated asparaginase enzyme having a concentration of between about 120 units of enzyme per kilogram of masa (as measured on a wet basis after addition of the mill water 26) and about 180 units of enzyme per kilogram of masa for between about 3 and about 10 minutes, which is the approximate residence times of the milled corn in the hog 45, through the masa pump 46 and transfer piping, and in the sheeter 50, can produce non-detect levels of acrylamide in tortilla chips that are fried to between about 0.9% and about 1.3% moisture in a fryer at a temperature of between about 340° F. and about 370° F.

While the above provides an example of how the present invention can be used in a tortilla chip embodiment, the present invention can be applied to any other fabricated snack as well. The term "fabricated snack" means a snack food that uses as its starting ingredient something other than the original and unaltered starchy starting material.

According to some such embodiments, the desired ingredients for making the dough are simultaneously mixed together with added water, and the desired amount of concentrated asparaginase. In one embodiment, the concentrated asparaginase is mixed directly with desired ingredients to make an asparagine deficient dough. The asparagine deficient dough can then be made into a thermally processed food product. As used herein, a thermally processed food product is a food product that has been heated to a food product temperature of greater than about 120° C./248° F. to a moisture content of less than about 2% by weight. In one embodiment, the asparagine deficient dough can be used to make a dried food product such as potato flakes. As used herein, a dried food product is a food product that has been heated to a food product temperature of greater than about 120° C./248° F. to a moisture content between about 6% by weight and about 15% by weight.

Figure 2:
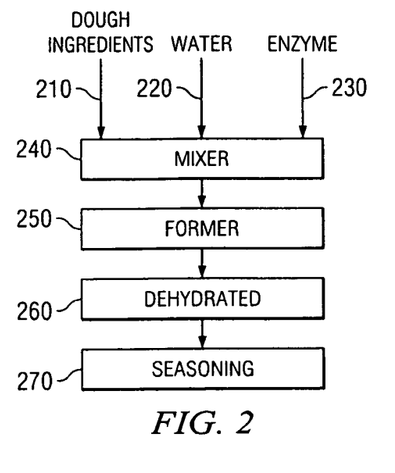
FIG. 2 is a simplified, schematic diagram illustrating one embodiment of the present invention as applied to a manufacturing process for making a salty snack such as pretzels or crackers.

FIG. 2 is a simplified, schematic diagram illustrating a generalized embodiment of the present invention. The diagram illustrated by FIG. 2 can be used for example to make pretzels or crackers in accordance with various embodiments of the present invention. This embodiment can represent a batch or continuous operation. In one embodiment (not shown), the enzyme 230 is injected into the added water 220 line just prior the water line entering the mixer 240. Because of the relatively short residence time between the enzyme 230 and the added water 220, such embodiment can be equivalent to adding water directly to the dough ingredients in the mixer 240.

As shown, concentrated enzyme 230 and dough ingredients 210 optionally with added water 220 can be placed into any suitable mixing system 240 and formed into a dough. As used herein, "a suitable mixing system" is defined as any vessel wherein one or more mechanical mixing devices are disposed within the mixing vessel and are adapted to mix the dough ingredients and concentrated enzyme within the vessel. A mechanical mixing device is a rotating or moving element that promotes physical mechanical mixing of the dough ingredients as the ingredients move through the vessel. Rotating or moving elements may include, for example, augers, paddles, pins, scrapers, propellers, turbines, or other devices that shear the dough ingredients to cause mixing. Continuous and batch mixers can be used. In one embodiment, a corn mill having an auger as a mechanical mixing device is a suitable mixer. Similarly, an extruder operating at temperatures lower than the deactivation temperature of asparaginase (82° C./180° F.) can also be used as a suitable mixer.

The dough can then be formed into pre-forms with any suitable former 250. For example a sheeter or an extruder can be used as a former. The pre-forms can then be dehydrated by any suitable dehydrator 260 such as a fryer or an oven. The dehydrated food pieces can then be optionally seasoned 270.

The dough ingredients 210 used can include wet or dry dough ingredients including, but not limited to flours, a cooked food product such as a cooked masa or a cooked wheat (which can have moisture contents greater than the 15% by weight), starches, sugar, potato flakes, syrup such as corn syrup or malt syrup, oil, such as corn oil, sodium bicarbonate, ammonium bicarbonate, malt syrup, and yeast. For example, the present invention can be used to make pretzels by mixing dough ingredients 210 such as wheat flour, corn syrup, corn oil, sodium bicarbonate, ammonium bicarbonate, malt syrup, and yeast together simultaneously with concentrated enzyme 230 and sufficient water 220 to a moisture level of between 38% and 45% by weight in a low batch mixer 240. The mixing 240 can occur at ambient pressures and typically between 80° F. to 100° F. After the mixing step 240, the dough is fed into an extruder for a forming step 250. This extrusion 250 occurs at low sheer and is done at ambient temperatures and typically rather low pressures, for example less than 100 psig. The dwell time in the extruder during the forming step 240 varies, but is typically in the 10 to 15 minute range. Because the mixing step 240 and the extrusion step 250 both occur at temperatures below the deactivation temperature of asparaginase, the asparaginase enzyme can react during the mixing step 240 and the extrusion step 250 in a pretzel making operation.

The dough exits the extruder in, for example, a single dough strand or rope configuration. This dough strand can be cut into individual strand segments. The segments can then be conveyed to a caustic bath. The caustic bath, using prior art methods, typically is about a 1% to 2% caustic aqueous solution between 180° F./82° C. to 200° F./93° C. for a dwell time up to about 25 seconds. From the caustic bath, the dough strands are then conveyed to a dehydrator 260, typically an oven, where the pretzels are baked to a moisture content of between about 2% to about 6% by weight. The pretzels can then be salted in a seasoning step 270 as desired.

Figure 3:
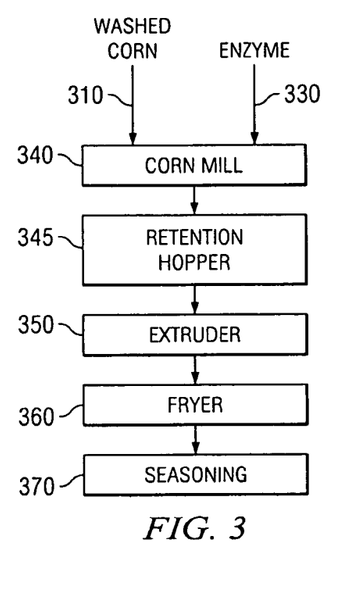
FIG. 3 is a schematic diagram illustrating one embodiment of the present invention as applied to a manufacturing process for making fried corn chips.

One advantage of the present invention is that enzyme can be added to dough ingredients to make a dough even when no added water is necessary or desired to make a dough. For example, FIG. 3 is a schematic diagram depicting one embodiment of the present invention as applied to fried corn chips. Washed corn 310 having a moisture content of about 50% by weight and concentrated enzyme 330 are mixed together in a corn mill 340. In this embodiment, no water is added to make the dough because the washed corn 310 has sufficient moisture. The washed corn 310 and concentrated enzyme are mixed in the corn mill 340 and routed to a retention hopper 345 for about 5 minutes to about 10 minutes, which is a sufficient contact time for asparaginase to substantially lower the level of the asparagine in the milled corn. The milled corn is then routed to an extruder 350 where the dough is extruded and cut into pieces and then fried in a fryer 360 at temperatures between about 200° C./392° F. and about 215° C./419° F. to a moisture content of about 0.3% to about 0.6% by weight. The cooked chips can then be routed for seasoning 370.

One advantage of the present invention, as demonstrated by the embodiment described above is that because water is not necessary as a carrier for the enzyme, the recipe of the food product does not have to be changed. For example, in prior art methods, the enzyme would have to be added via an added water matrix. So excess water would be added along with washed corn to the corn mill 340. This excess water would change the characteristic of the dough and could require some other type of compensation to the process. For example, the excess water may then have to be somehow removed. Removal of the additional water could occur through an additional dehydration step, a longer frying time, or could require changing the corn cook/soaking steps. These additional processing steps or changes can negatively impact the product because an additional dehydration step can reduce desirable flavor notes and is not necessary with the direct injection system of the present invention that injects concentrated enzyme into the corn mill. More energy would also be required to make such a product because of the additional dehydration step. Further, such additional dehydration step can have a detrimental impact on the texture because of more oil absorption. Consequently, one embodiment of the present invention provides a method for making an asparagine deficient dough without the addition of added water. One embodiment of the invention provides a method for making a thermally processed food product having a reduced level of acrylamide without the addition of any added water.

Another advantage of the present invention is that acrylamide reducing agents other than concentrated enzyme can be added directly to the dough either in conjunction with the concentrated enzyme or in addition to the concentrated enzyme. For example, dry ingredients can be mixed together in a ribbon blender or other suitable mixer. A first dough ingredient comprising a mix of dry ingredients can then be placed into an extruder with a second dough ingredient. In one embodiment, lysine can be placed into a first direct injection system and lysine can be directly injected from the first direct injection system into the mixer with the dry ingredients. A second direct injection system can be used to dispense concentrated asparaginase enzyme into the second dough ingredient prior to mixing the second dough ingredient with the dry ingredients in the extruder. In one embodiment, enzyme and/or lysine can also be injected into the extruder. There are several advantages to the embodiment depicted above. The second dough ingredient can have a relatively higher concentration of asparagine than the dry ingredients. Consequently, the second dough ingredient can be directly contacted with enzyme without dilution of the enzyme from premature mixing with the dry ingredients. Further, other acrylamide reducing agents such as free amino acids, food grade acids, and divalent/trivalent cations can be added in a concentrated state without the need for a carrier solution such as water. The extruded food pre-forms can be cooked and seasoned as desired.

Figure 4:
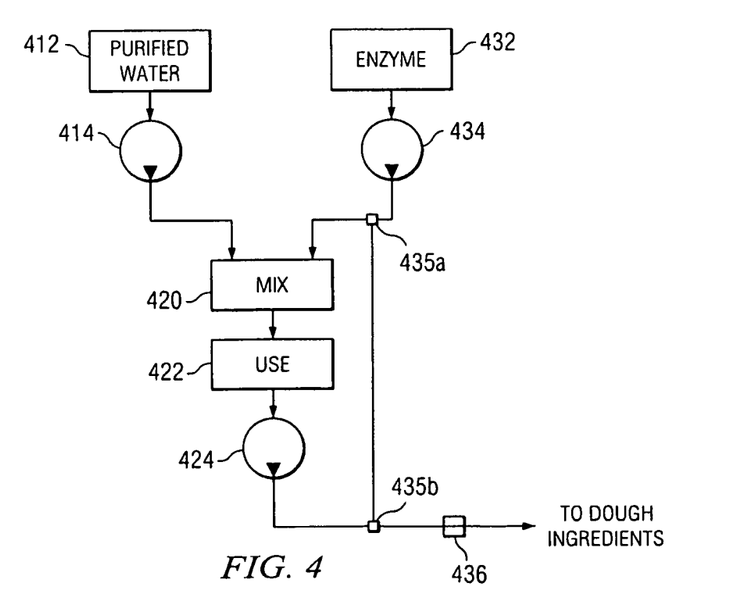
FIG. 4 is a schematic diagram illustrating one embodiment of the present invention having an enzyme mix tank.

In one aspect, the present invention is directed towards an apparatus for mixing a concentrated enzyme with purified water and the subsequent mixture is used in a food product. FIG. 4 is a schematic diagram illustrating such embodiment of the present invention. As shown in FIG. 4, purified water 412 can be pumped with a precision pump 414 to a mix tank 420 where it can be mixed with an enzyme that is pumped via a precision pump 434 from a storage tank 432. Because the enzyme is being mixed with purified water, the enzyme activity remains high after mixing. After sufficient mixing, the diluted enzyme can be stored in a use tank 422 where it can be pumped via a precision pump 424 to dough ingredients as needed. In one embodiment, a flow meter or flow switch 436 can be used to verify that the enzyme is being discharged to the dough ingredients.

In one embodiment, the system disclosed in FIG. 4 can optionally be configured for the direct injection of enzyme into dough ingredients. For example a first three way valve 435a and a second three-way valve 435b can be installed so that enzyme can be directly pumped from the enzyme storage tank 432 via the precision pump 434 through the flow switch 436 and into dough ingredients.

Food products that the concentrated additive, such as asparaginase, can be added to include, but are not limited to, doughs, slurries, and any other consumable products where it is desired to lower the level of acrylamide. For example, in one embodiment, the asparaginase solution is added to a potato slurry made from potato flakes. In one embodiment, the potato slurry is made by adding the asparaginase solution to potato flakes. Fabricated snacks include fabricated potato chips that use a dehydrated potato product as a starting material and corn chips that use masa flour as its starting material. It is noted here that the dehydrated potato product can be potato flour, potato flakes, potato granules, or other forms in which dehydrated potatoes exist. When any of these terms are used in this application, it is understood that all of these variations are included. By way of example only, and without limitation, examples of "fabricated foods" to which an asparaginase solution can be added include tortilla chips, corn chips, potato chips made from potato flakes and/or fresh potato mash, multigrain chips, corn puffs, wheat puffs, rice puffs, crackers, breads (such as rye, wheat, oat, potato, white, whole grain, and mixed flours), soft and hard pretzels, pastries, cookies, toast, corn tortillas, flour tortillas, pita bread, croissants, pie crusts, muffins, brownies, cakes, bagels, doughnuts, cereals, extruded snacks, granola products, flours, corn meal, masa, potato flakes, polenta, batter mixes and dough products, refrigerated and frozen doughs, reconstituted foods, processed and frozen foods, breading on meats and vegetables, hash browns, mashed potatoes, crepes, pancakes, waffles, pizza crust, peanut butter, foods containing chopped and processed nuts, jellies, fillings, mashed fruits, mashed vegetables, alcoholic beverages such as beers and ales, cocoa, cocoa powder, chocolate, hot chocolate, cheese, animal foods such as dog and cat kibble, and any other human or animal food products that are subject to sheeting or extruding or that are made from a dough or mixture of ingredients.

The use of the term "fabricated foods" herein includes fabricated snacks as previously defined. The use of the term "food products" herein includes all fabricated snacks and fabricated foods as previously defined.

As referred to herein, the thermally-processed foods include foods that can be treated with an asparaginase solution, by way of example and without limitation, all of the foods previously listed as examples of fabricated snacks and fabricated foods. Those skilled in the art, armed with this disclosure will understand that the present invention can be used anywhere an asparaginase solution is desired to reduce the level of acrylamide in a food product.

The direct injection system can be used to inject other acrylamide reducing agents including but not limited to asparaginase, food grade acids, a pH reducing salt anions having a pKa of less than about 6, such as calcium chloride, amino acids including cysteine, lysine, glycine, histidine, alanine, methionine, glutamic acid, aspartic acid, praline, phenylalanine, valine, and arginine, as well as any acrylamide reducing agent disclosed in U.S. patent application Ser. No. 11/624,476 to make any food product described herein. An acrylamide reducing agent is an agent which reduces the formation of acrylamide in foods.

In addition, the direct injection system can be used to inject other desirable concentrated additives into food-based doughs to make any of the food products described herein. Concentrated liquid additives that can be added can include, but are not limited to vitamins, coloring agents, and flavoring agents.

The Test Method used to determine asparaginase activity for the Examples in Table 1 of this application is shown below:

I. Background The SIGMA procedure for asparaginase activity used a Tris buffer at pH 8.6 (Sigma catalogue A 4887). Because food grade asparaginase has low activity at pH 8.6, the assay was changed to pH 7.0 with MOPS (3-morpholinopropanesulfonic acid).

II. Principle:

L-Asparagine+H2O $\xrightarrow{Asparaginase}$ L-Aspartate+NH3

III. Conditions: T=37 C, pH=7.0, $A_{436}$, Light path=1 cm

IV. Method: Spectrophotometric Stop Rate Determination

V. Reagents
   a. 100 mM MOPS sodium salt (3-morpholinopropanesulfonic acid). Weigh out 2.09 g of MOPS (Sigma M5162). Dissolve in about 60 ml of DI water at room temperature. Add sodium hydroxide to adjust pH to 7.0. Make up to 100 ml with DI water. Store in refrigerator when not in use.
   b. 189 mM L-Asparagine Solution Weigh out 0.25 g of L-asparagine anhydrous, and dissolve in 10 ml DI water. Store in refrigerator when not in use. After refrigeration, sonicate to dissolve asparagine crystals before using.
   c. 6 mM Ammonium Sulfate Standard Solution ((NH4)2SO4 Standard) Weigh out 0.079 of ammonium sulfate on an analytical balance, and record weigh to 0.0001 g. Dissolve and make up to volume with 100 ml with DI water. Store in refrigerator when not in use.
   d. 1.5 M Trichloroacetic acid (TCA) Weigh out 2.45 g of trichloroacetic acid. Dissolve and make up to 10 ml with DI water.
   e. Ammonia Color Reagent: Test kit for Ammonia Nitrogen High, Nesslerization, LaMotte Code 3642-SC, VWR Cat. No. 34186-914. The reagent #2 contains mercury.
   f. Asparaginase Enzyme Solution: Immediately before use, prepare a solution containing 2.0-4.0 units/ml of asparaginase in room temperature deionized water. If enzyme is frozen, thaw completely in lukewarm water before taking an aliquot for dilution. For typical enzyme concentrations, 0.1 ml of enzyme solution can be diluted to 50 ml.

VI. Procedure:
   a. Set heating block for vials to 37 C.
   b. Use an adjustable micropipette to transfer the following reagents into vials (ml):

| Reagent | Test | Enzyme Blank | Std. 1 | Std. 2 | Std. 3 | Reagent Blank |
|---|---|---|---|---|---|---|
| A (Buffer) | 1.00 | 1.00 | 1.00 | 1.00 | 1.00 | 1.00 |
| B (L-ASN) | 0.10 | 0.10 | — | — | — | — |
| C (Ammonium Std.) | — | — | 0.25 | 0.50 | 1.00 | — |
| DI Water | 0.90 | 0.90 | 0.85 | 0.60 | 0.10 | 1.10 |
| F (Enzyme Solution) | 0.10 | — | — | — | — | — | c. Cap vials, and place in heating block at 37 C. Start agitation of heating block.
   d. Remove vials from heating block after 30 minutes. Decap vials, immediately add TCA reagent, and mix. Then add Reagent F (Enzyme Solution) to Enzyme Blank. For enzyme test solutions, the time between removal of the vials from the heating block and addition of TCA should be as short as possible. After TCA is added, time before ammonia measurement is not critical. For blanks and standards, time between removal from the heating block and addition of TCA is not critical.

| Reagent | Test | Enzyme Blank | Std. 1 | Std. 2 | Std. 3 | Reagent Blank |
|---|---|---|---|---|---|---|
| D (TCA) | 0.10 | 0.10 | 0.10 | 0.10 | 0.10 | 0.10 |
| F (Enzyme Solution) | — | 0.10 | — | — | — | — | e. Pipet 0.20 ml of each solution into test tubes or vials. Add 4.30 ml of deionized water, 4 drops of LaMotte reagent #1, and 0.50 ml of LaMotte #2. Mix solutions and leave at room temperature for 10-20 minutes before reading absorbance at 436 nm in 1 cm cell. Zero the spectrophotometer with DI water.

VII. Calculation of Results
  a. The enzyme activity is calculated from a calibration curve for ammonia (umole/0.2 mL).
  b. Description of Calculation Steps.
    i. Calculation of ammonium sulfate standard solution concentration:
      mM=(0.0809 g)*(1000 mM/M)*(2 NH3/NH4SO4)/((132.14 g/mole)*(0.1 L))=12.24 mM=mmole/L=umole/ml
    Where 0.0809 g is weight of ammonium sulfate for standard
    ii. Calculate umole of NH3 in 2.2 ml standards:
      umole of NH3 in 2.2 mL=(NH3 umole/mL of standard solution)*(mL of standard)
    iii. Calculate umole of NH3/0.2 mL:
      umole of NH3/0.2 mL=(umole of NH3 in 2.2 ml)*(0.2 mL)/(2.2 mL)
    iv. Calculate regression curve with
      x=A436
      y=NH3 umole/0.2 mL
    v. From calibration curve, umole of NH3/0.2 ml is calculated:
      umole of NH3/0.2 mL=(slope)*(A436)+Intercept
    vi. The activity of the diluted enzyme solution is calculated with the following formula:

Units/ml enzyme=

(umole of NH3 liberated)*(2.20)/(0.2*30*0.1) where 2.20 ml=Volume from Step 1(Step 1 is enzyme assay solution.)
      0.2 ml=Volume of Step 1 used in Step 2 (Step 2 is color development.)
      30 minutes=Time of assay in minutes
      0.1 ml=Volume of enzyme used
    vii. The dilution factor is 50 mL divided by volume of concentrated enzyme diluted to 50 mL.
    viii. Concentration of enzyme solution before dilution=(units/ml of diluted solution)*(dilution factor)

While the invention has been particularly shown and described with reference to several embodiments, it will be understood by those skilled in the art that various other approaches to the preservation of the residual asparaginase activity in solution may be made without departing from the spirit and scope of this invention.

What is claimed is:

1. A method for the direct injection of a liquid additive into a dough-based product, said method comprising the steps of:
  a) providing a concentrated liquid additive, wherein said concentrated liquid additive comprises a liquid matrix having no chlorinated water and further wherein said concentrated liquid additive comprises asparaginase;
  b) adding said concentrated liquid additive directly to dough ingredients; and
  c) mixing said concentrated liquid additive into said dough ingredients to form an asparagine deficient dough, wherein if any additional water is necessary to form the dough, the additional water is added to the dough ingredients via a different stream than the concentrated liquid additive, and further wherein said mixing comprises a grinding step.

2. The method of claim 1 wherein said additive comprises an acrylamide reducing agent.

3. The method of claim 2 wherein said additive consists essentially of asparaginase.

4. The method of claim 1 wherein said additive comprises a coloring agent.

5. The method of claim 1 wherein said additive comprises a flavoring agent.

6. The method of claim 1 wherein said additive comprises lysine.

7. The method of claim 1 wherein said additive comprises a divalent or trivalent cation.

8. The method of claim 1 wherein said additive comprises a vitamin.

9. The method of claim 1 wherein said dough ingredients comprise dry ingredients and said adding at step b) further comprises the addition of added water, wherein said added water and said concentrated liquid additive of step b) are added via different streams.

10. The method of claim 1 omitting the addition of added water.

11. The method of claim 1 wherein said dough ingredient at step b) comprises de-hulled washed corn, and said mixing step comprises grinding in a mill.

12. The method of claim 1 comprising a residence time of at between about 5 and about 10 minutes.

13. The method of claim 1 wherein said adding step b) is performed by injecting a said concentrated liquid additive onto said dough ingredients with a direct injection system.

14. The method of clam 1 wherein said concentrated liquid additive is added at step b) at a rate of between about 5 drops to about 2500 drops per minute.

15. The method of claim 1 further comprising the step of thermally processing said dough to make a thermally processed food product.

16. The method of claim 1 wherein said dough is processed for the production of a food product selected from the group consisting of tortilla chips, pretzels, crackers, and corn chips.

17. The method of claim 1 wherein said method is performed in a continuous operation.

18. The method of claim 17 wherein said continuous operation injects a set rate of said concentrated liquid additive of between about 20 ml and about 10000 ml per hour of a concentrated asparaginase having an activity of between about 1000 units per gram and about 4000 units per gram.

* * * * *